United States Patent [19]

Ingram et al.

[11] Patent Number: 4,702,354
[45] Date of Patent: Oct. 27, 1987

[54] BRAKE ACTUATOR

[75] Inventors: Brian Ingram, Alyburton; Hugh G. Margetts, Ross-on-Wye; John R. Rees, Chepstow, all of England

[73] Assignee: Lucas Industries, Birmingham, England

[21] Appl. No.: 6,341

[22] Filed: Feb. 2, 1987

Related U.S. Application Data

[63] Continuation of Ser. No. 694,254, Jan. 24, 1985, abandoned.

[30] Foreign Application Priority Data

Feb. 2, 1984 [GB] United Kingdom ............... 8402775

[51] Int. Cl.⁴ .............................................. F16D 65/56
[52] U.S. Cl. .......................... 188/196 D; 188/79.5 R
[58] Field of Search ...................... 188/79.55, 79.56 E, 188/196 D, 196 A, 196 C, 71.9, 334, 363, 196 V, 79.5 R

[56] References Cited

U.S. PATENT DOCUMENTS

| | | | |
|---|---|---|---|
| 3,809,189 | 5/1974 | Farr | 188/196 D X |
| 3,811,538 | 5/1974 | Farr | 188/196 D X |
| 3,878,923 | 4/1975 | Farr | 188/196 D |
| 4,006,669 | 2/1977 | Price | 188/79.5 GE X |
| 4,530,424 | 7/1985 | Fukuzawa et al. | 188/196 D |
| 4,533,875 | 8/1985 | Ingram et al. | 188/196 D X |

Primary Examiner—Duane A. Reger
Assistant Examiner—Matthew C. Graham
Attorney, Agent, or Firm—Holman & Stern

[57] ABSTRACT

A hydraulic actuator for a vehicle brake incorporates an automatic adjuster which includes a strut of variable length formed by members which are threadedly interengaged by way of non-reversible screw thread connection. The member is an adjuster shaft which forms a reversible screw thread connection with a drive ring arranged to control rotation of the adjuster shaft during brake application and release. The non-reversible thread is subject, during brake application, to an axial force which is the resultant of forces derived from the braking pressure applied to different areas defined respectively by a seal on the piston and a further seal on the adjuster shaft. This ensures that random rotation of the adjuster shaft during brake application is resisted without the necessity for the application of axial spring load.

7 Claims, 6 Drawing Figures

BRAKE ACTUATOR

This is a continuation of application Ser. No. 694,254, filed Jan. 24, 1985 now abandoned.

BACKGROUND OF THE INVENTION

This invention relates to an hydraulic actuator for a vehicle brake, and particularly for an internal shoe drum brake, the actuator incorporating an automatic adjuster operable, in response to excess brake-applying movement of a braking element, resulting for example from normal lining wear, to make a compensating adjustment for such excess movement.

An actuator has already been proposed, primarily for a shoe drum brake, in which the automatic adjuster is arranged to act between a hydraulic piston and a relatively fixed cylinder body of the actuator, the adjuster including a variable length strut formed by an adjuster shaft threadedly engaging the piston by way of a non-reversible screw thread, a portion of the shaft being provided with a reversible thread engaged by an annular body which is spring-urged towards engagement with a conical clutch face formed on the cylinder body. Outward movement of the piston for brake actuation causes the shaft to relieve the spring force urging the ring against its clutch face, thereby enabling the ring to slip against said face and be driven in rotation by the reversible thread relative to the shaft. Upon brake release, the piston is retracted by the shoe return springs and the ring is again urged against its clutch seat so that torque then generated in the reversible thread causes the shaft to rotate relative to the restrained ring, thereby lengthening the strut and setting a new retracted position of the shoe associated with the actuator.

The operation of this adjuster depends upon generating a greater torque in the non-reversible thread than that induced at the reversible thread in order to ensure that the shaft does not rotate with the ring and this is accomplished by providing a compression spring acting axially between the shaft and cylinder body.

It has been found that when the shoe return spring force across the adjuster is relieved as a result of brake actuation, vibrations arising in the brake assembly can cause the adjuster shaft and compression spring to oscillate with resultant fluctuations in load in the non-reversible thread. Because the compression spring is lengthened and its force thereby diminished during outward movement of the piston, the residual force which it exerts in this condition may not be sufficient to prevent random rotation of the adjuster shaft which can lead to unwanted variation in the adjustment condition of the adjuster and a consequent difference in pedal travel upon subsequent brake application.

A further disadvantage of the compression spring is that the load which it imposes on the non-reversible thread is at a maximum when the brakes are retracted and must be overcome to permit manual de-adjustment of the brake which may be required, for example, for servicing purposes.

SUMMARY OF THE INVENTION

An object of the present invention is to provide a hydraulic actuator incorporating an automatic adjuster of the general kind described above wherein the force generated at the non-reversible thread increases during actuation, thereby minimising the tendency for unwanted de-adjustment.

According to the invention, a hydraulic actuator for a vehicle brake comprises an actuator piston slidable within a cylinder body, and an automatic adjuster which includes a strut of variable length formed by members threadedly interengaged by way of a non-reversible screw thread connection, one of said members being an adjuster shaft which forms a reversible screw thread connection with means arranged to control rotation of the adjuster shaft during brake application and release, the arrangement being such that said members are respectively influenced, in use, during brake application, by forces derived from the application of the actuating pressure over different areas, thereby creating a resultant force tending to resist torque generated in said non-reversible screw thread connection.

It will be seen that, with this arrangement, it is possible to dispense with the internal compression spring, whilst at the same time loading the non-reversible thread during brake application in a manner such that the load increases with braking pressure, thus preventing random rotation of the adjuster shaft. Since the non-reversible thread is no longer subject to the force of an internal compression spring loading the threads in the released condition of the brake, manual de-adjustment of the brake is resisted only by seal friction forces and is thereby facilitated.

In one convenient arrangement, said different pressure areas are associated respectively with the piston and adjuster shaft, the adjuster shaft preferably extending within and being sealed against a bore of the piston to form a pressure area smaller than that associated with the piston. The non-reversible screw thread connection is preferably between the adjuster shaft and a nut element non-rotatably coupled to the piston. This arrangement is particularly advantageous in that the nut member can be allowed a degree of floating movement relative to the piston so that concentricity problems are minimised, which means that manufacturing tolerances can be relaxed to some extent, leading to increased ease of manufacture. A further advantage is that the conventional steel piston may be replaced by one of light weight material, such as ceramics, plastics or alloys, the nut then being conveniently of sintered material.

BRIEF DESCRIPTION OF THE DRAWINGS

The invention will now be described, by way of example, with reference to the accompanying drawings in which.

DETAILED DESCRIPTION OF THE DRAWINGS

Figure 1:
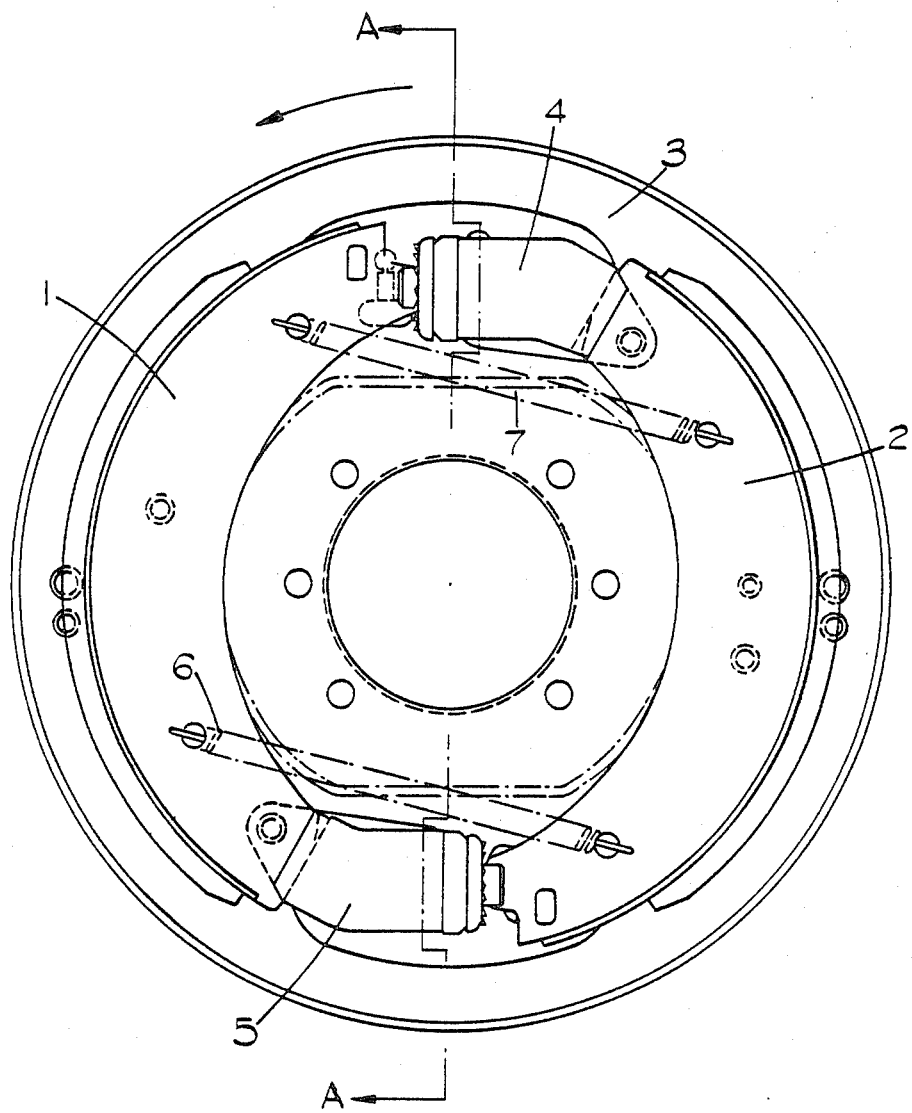
FIG. 1 is an end view of an internal shoe drum brake incorporating one form of the actuator of the invention.
Figure 2:
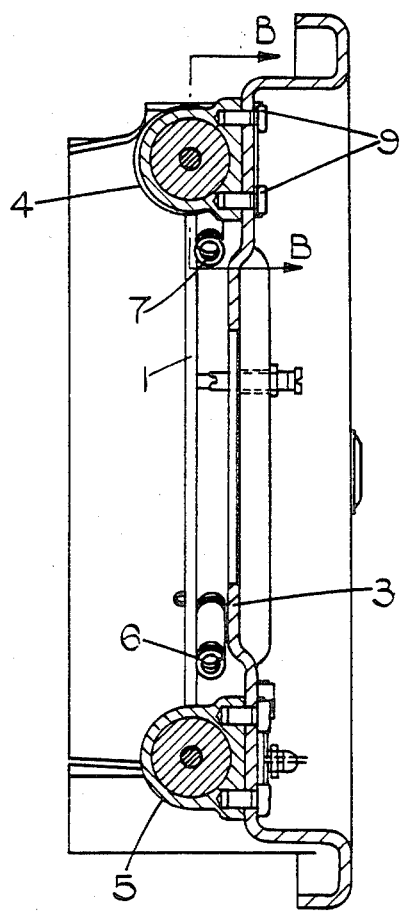
FIG. 2 is a cross-section on the line A—A of FIG. 1.

Referring to FIGS. 1 and 2 of the drawings, these illustrate one form of the actuator of the invention incorporated in a shoe drum brake of the two leading shoe configuration. The brake includes a pair of brake shoes 1, 2 mounted on a back plate 3 and a pair hydraulic actuators 4, 5 secured to the back plate and disposed respectively between adjacent pairs of ends of the shoes, the actuators being, in this case, identical and arranged to act in opposed directions in order to produce the two leading shoe brake configuration. The shoes are urged against the actuators by return springs 6 and 7 and, upon actuation, the shoe 1 is urged outwardly by the actuator 4 at its end adjacent the actuator, the other end of the shoe abutting the body of the actuator 5 and performing pivotal movement thereon during actuation. The shoe 2, of which one end abuts the body of the actuator 4, is actuated by the actuator 5 in identical manner.

Figure 3:
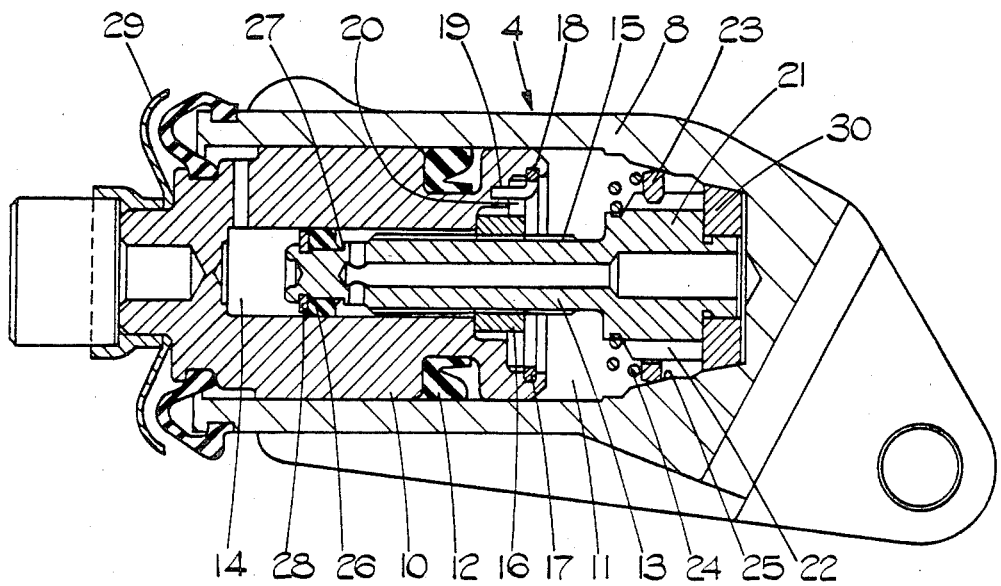
FIG. 3 is an enlarged cross-sectional view along the line B—B of FIG. 2.

FIG. 3 illustrates the actuator 4 in more detail (the actuator 5 being identical in this embodiment). The actuator comprises a cylinder body 8 secured to the backplate by bolts 9 (FIG. 2) and having a piston 10 slidable within an axial bore 11 of the cylinder body, being sealed against the internal cylindrical wall of the bore by a seal 12. The position of the piston 10 in the released condition of the brake is controlled by an automatic adjuster mechanism which comprises an adjuster shaft 13 arranged co-axially with the piston 10 and extending within an axial bore 14 of the piston.

The adjuster shaft 13 has an external screw thread 15 over a major part of its length which forms a non-reversible screw threaded connection with a nut element 16 coupled to the piston 10 in non-rotatable manner by a retaining clip 17 engaged within a groove 18 of the piston and having one or more projecting arms 19 engaged within respective slots 20 of the nut element to effect said non-rotatable coupling between the nut element and piston. The nut illustrated is a one-piece component, but an alternative nut may be in the form of a sub-assembly in which a central nut portion is provided with a pressed-on flange retained by a shoulder on the nut and being slotted to receive projecting arms 19, as described above. One end portion of the shaft 13 is in the form of an enlarged boss 21, on the external surface of which is provided a fast thread 22 which forms a reversible screw thread connection with an annular clutchable member 23, referred to for convenience as a drive ring. The drive ring is normally urged in conventional manner, by a spring 24, into firm clutching engagement with an internal conical clutch surface 25 of the cylinder body 8.

The end of the adjuster shaft remote from the boss 21 is sealed against the internal wall of the bore 14 by means of a seal 26 trapped between a shoulder 27 of the shaft and a retaining washer or similar device 28 engaged in a groove of the shaft.

The actuator is illustrated in the brakes released condition. When hydraulic fluid is applied under pressure to the bore 11 of the cylinder body, the piston 10 will move outwardly, carrying with it the nut element 16 and adjuster shaft 13. The required shoe to drum clearance is set by providing an appropriate backlash in the reversible thread between the drive ring 23 and adjuster shaft and, in the event that outward shoe movement does not exceed said clearance, no rotation of the drive ring will occur. It will be seen, however, that the actuating pressure is also applied over the area of the seal 26, which, being smaller than that of the seal 12, results in differential forces being applied to the piston and adjuster shaft. The resultant force thus produced creates sufficient load in the non-reversible screw thread between the nut element and adjuster shaft to resist random rotation of the shaft which might otherwise occur as a result of vibrations to which the brake can be subjected, in use. Such random rotation is most likely to occur during brake actuation when the shoe return spring force across the strut formed by the piston and adjuster shaft assembly is relieved as a result of shoe separation.

When the shoe contacts the drum, the force resulting from pressure applied to the seal 12 is fully reacted and the force between the nut element and adjuster shaft is maintained, as a result of the pressure applied to the seal 26. Random rotation of the adjuster shaft therefore continues to be resisted.

When adjustment is required, as a result of excessive outward shoe movement, the adjuster shaft moves more than the distance required to take up the aforesaid backlash and the drive ring 23 is then urged in a direction away from the clutch face 25 and rotates through an angular distance depending upon the outward movement of the adjuster shaft. During this time, the aforesaid load is maintained in the non-reversible screw thread and this additionally acts to counter any tendency for the adjuster to rotate the shaft during angular movement of the drive ring 23. Once this has occurred, return movement of the shoes takes place under the action of the shoe return springs, when the braking pressure is released, moving the adjuster shaft axially until the drive ring 23 once again comes into clutching engagement with the housing. Rotation of the adjuster shaft relative to the nut will then take place as the shaft 13 moves through the drive ring 23, thereby effecting a corresponding lengthening of the adjuster strut to set a new retracted position of the brake shoes.

Manual de-adjustment may be effected by rotating a manual adjuster wheel 29 secured to the outer end of the piston and since the adjuster shaft is now prevented from rotation by re-engagement of the drive ring 23 with its clutch face 25, and additionally by a further cone clutch element 30 carried by the adjuster shaft, the piston can be rotated relative to the adjuster shaft 13, in a direction such as to move it into the cylinder housing. It will be seen that de-adjustment takes place against only the friction of seals 12 and 26 and may therefore be readily effected.

The use of the separate nut element 16 not only minimises potential concentricity problems between the adjuster shaft 13 and piston 10, but also obviates the necessity for an internal thread within the bore 14 of the piston, which means that the piston may be manufactured from light weight material, such as ceramics, plastics or alloys. Only the nut 16, through which relatively large forces are transmitted between the piston and adjuster shaft, now needs to be a relatively heavy duty component and may conveniently be made from sintered material.

Figure 4:
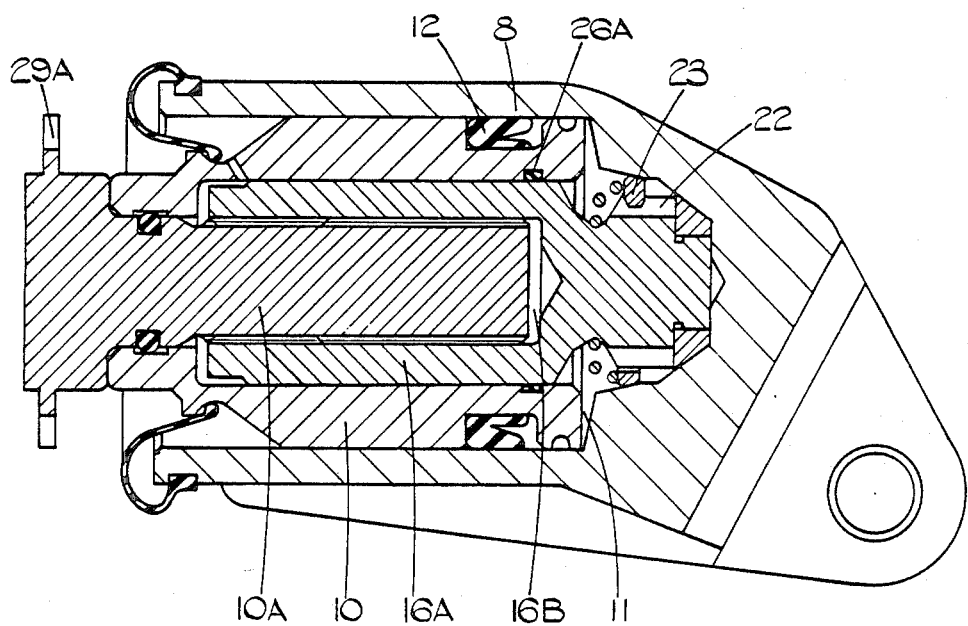
FIGS. 4 to 6 are views similar to FIG. 3 and respectively illustrating alternative embodiments of the actuator of the invention.

In the embodiment of FIG. 4 the piston 10 is provided with a separate elongate externally threaded intermediate member 10A extending co-axially within the piston 10 over a major part of the length thereof. The nut element 16A, which, in this embodiment, also constitutes the adjuster shaft, extends co-axially within the piston 10 and has an internally threaded co-axial internal bore 16B within which the member 10A is threadedly engaged to form the non-reversible screw thread connection between the shaft 16A and piston assembly 10, 10A. An inner end portion of the shaft is provided with an external fast thread 22 and a drive ring 23 co-operates with this in the manner described previously. A seal 26A is provided between the piston 10 and the adjuster shaft 16A and the differential pressure areas, in this embodiment, are those represented by the seal 12 of the piston 10 and the seal 26A. When pressure fluid is introduced into the chamber 11 for brake application, the piston 10, member 10A and adjuster shaft 16A move together outwardly of the cylinder and the non-reversible thread is loaded by a force resulting from the difference between the forces arising from action of the actuating fluid over the respective areas of the seals 12 and 26A. When the associated shoe contacts the drum, the non-reversible threaded connection remains loaded to prevent random rotation of the adjuster shaft 16A, as mentioned previously. When the actuating pressure is removed, the assembly of components 10, 10A and 16A will move back into the body 8 and adjustment will occur, if necessary, in the manner previously described although this time with the member 16A rotating to elongate the strut. In this embodiment, a manual retractor wheel 29A is formed integrally with the member 10A and the latter can be rotated by manipulation of the wheel 29A to vary the length of the adjuster strut assembly.

Figure 5:
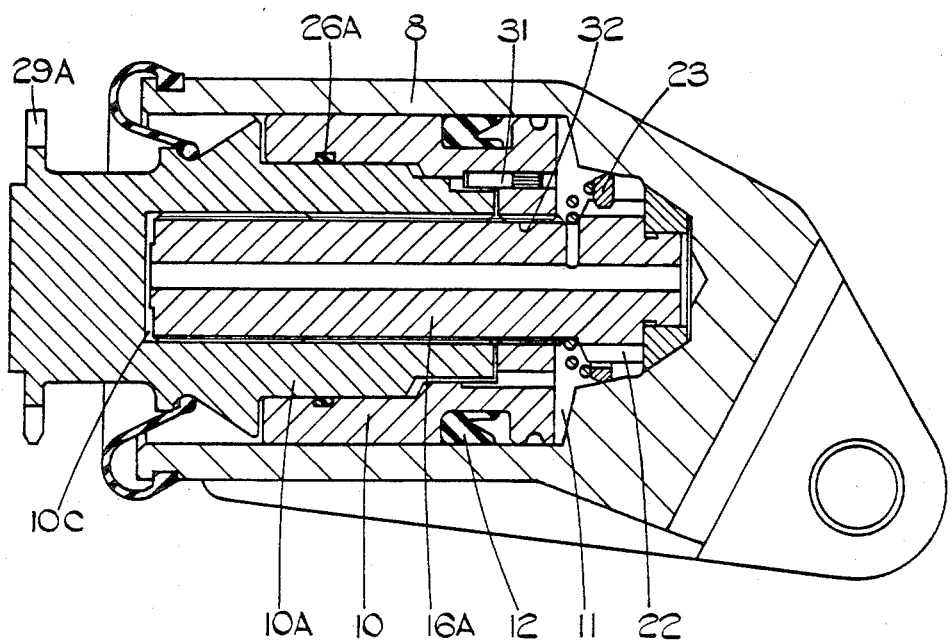

FIG. 5 illustrates an actuator in which the piston 10 again has a separate intermediate member 10A extending co-axially within the piston proper 10, but in this arrangement, the components 10 and 10A are keyed together against rotation by a pin 31 and both components have respective co-axial internally threaded bores 10C and 32 within which an externally threaded adjuster shaft 16A is threadedly engaged to form the non-reversible screw thread connection. The adjuster shaft has an external reversible thread 22 at one end thereof, engaged by a drive ring 23, as previously. A seal 26A is provided between the piston proper 10 and member 10A to provide the smaller of the two differential pressure bearing surfaces. When pressure fluid is introduced into the bore 11 of the cylinder 8, the piston components 10, 10A and the adjuster shaft 16A move outwardly together and the resultant force from the differential pressure areas again induces a load in the non-reversible thread to prevent unwanted random rotation of the adjuster shaft, as before, in the brakes applied condition. Manual actuation of the adjuster can again be effected by rotation of wheel 29A which in turn rotates components 10 and 10A relative to shaft 16A.

Figure 6:
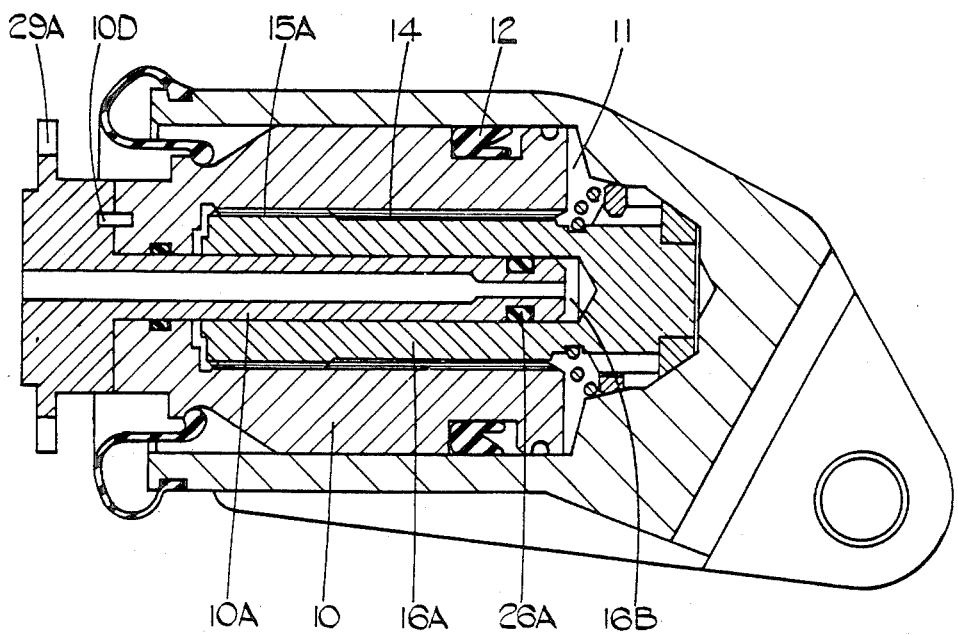

In the embodiment illustrated in FIG. 6, the piston 10 is again provided with an inwardly extending intermediate member 10A which is keyed at 10D to the piston 10 in order to prevent relative rotation between these components. The adjuster shaft 16A extends within an internally threaded bore 14 of the piston 10 and has an externally threaded portion 15A which is threadedly engaged within the bore 14 to form the non-reversible screw thread connection. In this arrangement, the member 10A extends within a co-axial bore 16B of the adjuster shaft and a seal 26A between the member 10A and internal wall of the bore 16B provides the smaller of the two differential pressure areas.

Fluid pressure introduced into the cylinder again causes the piston components 10 and 10A and the adjuster shaft 16A to move together as an assembly. The non-reversible screw thread connection is loaded by the resultant force from the pressure applied respectively to the seals 12 and 26A to prevent rotation of the shaft during application of the brake. Again, upon contact of the shoe with the drum, the non-reversible thread remains loaded by the pressure over the small seal area 26A to prevent unwanted random rotation thereof. The action during brake retraction is as described above and manual de-adjustment can be effected by acting upon an integral adjuster wheel 29A in order to rotate both piston parts together, via the key 10D, relative to the stationary adjuster shaft.

It will be understood that the actuator of the invention may be modified in various ways as regards the form and arrangement of its various components and its manner of use. Although described as a single acting device, it may alternatively be in double acting form, incorporating a pair of opposed pistons, each having an associated adjuster. It could also take the form of a wedge actuator. Again, although described in a drum brake context, it may alternatively be adapted for use as a disc brake actuator. It will also be understood that, although the actuator of the invention is described in relation to a two leading shoe drum brake, it may be incorporated, as desired, in any other form of drum brake, such as a leading-trailing brake configuration.

In this specification, the term "reversible screw-thread connection" between two members will be understood to mean a connection of the kind in which rotational movement of one of the members is caused by axial displacement of the other and vice versa. The term "non-reversible screw-thread connection between two members" will be understood to mean a connection in which relative rotation between the two members cannot take place as a result only of axial force applied to one of the members. The reversibility or otherwise of a screw thread connection depends upon the pitch of the threads and the flank angles of the thread form, as well as on the co-efficient of friction between the members.

What is claimed is:

1. A single-acting hydraulic actuator for a vehicle brake, comprising:

a cylinder body; said cylinder body having a clutch face;

an actuator piston slidable within said cylinder body;

an automatic adjuster which includes a strut of variable length, said strut including strut members threadedly interengaged by a non-reversible screw thread connection;

one of said strut members being a rotatably supported adjuster shaft; a control means adapted to contact said clutch face for controlling rotation of said adjuster shaft; said adjuster shaft including a reversible screw thread for engagement with a similar thread on said control means to form a reversible screw thread connection;

said actuator piston supporting a nut; said actuator piston having an area upon which hydraulic pressure acts; said nut being one of said strut members and having a threaded portion, said adjuster shaft including a threaded portion in engagement with said nut; said engaged, threaded portions forming said non-reversible screw thread connection; said nut being separate from but non-rotatably coupled to said actuator piston; said actuator piston having a first surface forming a pressure area;

said adjuster shaft extending within a bore in said actuator piston and being sealed against said bore to form a pressure area smaller than said piston area;

a means for applying actuating pressure to said actuator piston and said adjuster shaft areas so as to create a first force on said piston area and a second force on said adjuster shaft area; said forces acting in the same direction, upon brake actuation, to produce a resultant force loading said non-reversible screw thread connection;

whereby said resultant force generates a force in said non-reversible screw thread connection such as to resist relative rotation of said strut members.

2. An actuator according to claim 1 wherein the adjuster shaft is slidably mounted within a bore of the piston and has a threaded bore formed therein which receives a correspondingly threaded intermediate member to form said non-reversible connection, said intermediate member being rotatable relative to the piston.

3. An actuator according to claim 1 wherein said means arranged to control rotation of the adjuster shaft is a clutch ring having one part of the reversible screw thread connection formed thereon and being biassed towards a position in which a clutch face thereof engages a fixed clutch face.

4. An actuator according to claim 3 wherein said part of the reversible screw thread connection is formed on the internal periphery of the clutch ring which surrounds the adjuster shaft with said thread part in engagement with a corresponding external thread part on said shaft, said fixed clutch face being on the cylinder body.

5. An actuator according to claim 1 wherein a further clutch face is carried by the adjuster shaft for engagement with a fixed clutch face.

6. An actuator according to claim 1 wherein one of said adjuster members, or means rotatable therewith, is provided with a manually operable formation enabling relative rotation between the adjuster parts to be effected manually and the strut length thereby varied.

7. A single-acting hydraulic actuator as claimed in claim 1, wherein said reversible screw thread connection is spaced axially along said adjuster shaft from said non-reversible screw thread connection.

* * * * *